Figure 1:
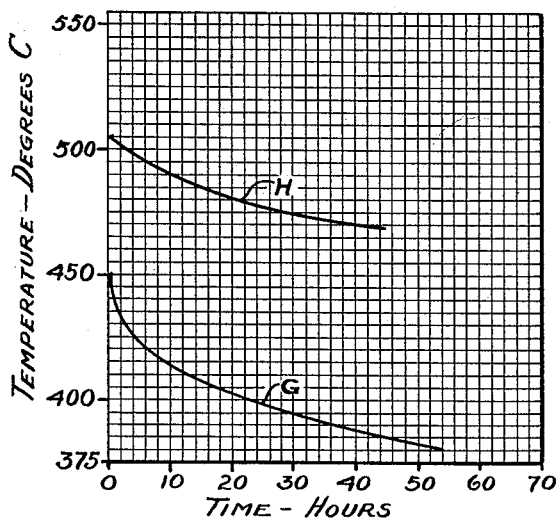

Feb. 28, 1939.  H. R. LILLIE ET AL  2,148,630

METHOD OF TEMPERING GLASS

Filed Dec. 30, 1935

INVENTOR.
HOWARD R. LILLIE
AND WILLIAM W. SHAVER
BY
ATTORNEYS.

Patented Feb. 28, 1939

2,148,630

UNITED STATES PATENT OFFICE 2,148,630

METHOD OF TEMPERING GLASS

Howard R. Lillie and William W. Shaver, Corning, N. Y., assignors to Corning Glass Works, Corning, N. Y., a corporation of New York Application December 30, 1935, Serial No. 56,814

11 Claims. (Cl. 49—89)

Investigations have led us to the conclusion that for every temperature glass has a certain preferred molecular arrangement and if held at any given temperature for a sufficient length of time the corresponding molecular arrangement will be eventually attained. This condition is, of course, accelerated as the glass becomes less viscous and more mobile as the molecules are then more free to move about than when the glass is stiff and hard. Hence, if glass is cooled rapidly from a high temperature in the manner commonly practiced in the art of glass tempering, or if a rapid annealing schedule is employed, the stiffness of the glass increases at such a rapid rate that the corresponding change in molecular arrangement necessarily lags behind and thus there is produced the effect of freezing into the glass a molecular arrangement which is different from that which the glass would have had were its temperature lowered at the same rate as the change in molecular arrangement takes place. In the case of tempered glass, such a molecular arrangement approaches that prevailing in the glass just prior to chilling it, whereas in annealed glass the molecular arrangement more nearly approaches that of the final temperature of the glass. In glass annealing practice, as heretofore conducted, the molecular arrangement of the glass lags far behind its change in temperature and release of strain with the result that a condition of molecular instability is frozen, as it were, into the glass. Since the temperature at which the glass is used in service calls for a certain definite molecular arrangement, it can be seen that even in the most perfectly annealed piece of glass, due to the lag, there are forces at work which are resisted by the stiffness of the glass but which, nevertheless, continue to exert their influence long after an article has been placed in service. The rapidity with which molecular stabilization progresses being dependent upon the stiffness of the glass, it becomes evident that upon relaxation of the glass stiffness the rate of molecular change will be accelerated. That the stiffness of glass can be relaxed by subjecting it to heat is well known and hence it becomes apparent that molecular stabilization can be accelerated by subjecting a fabricated article to heat. In order to obtain maximum stabilization in minimum time, the temperature to which the article is heated should considerably exceed the maximum temperature which it will attain in service. For obvious reasons the temperature to which the article is subjected to attain such stabilization should not exceed the strain temperature of the glass though for many purposes the temperature to which the glass is subjected for molecular stabilization may approach the strain temperature.

Based on the theory that the molecular arrangement of tempered glass approaches that of the hot glass prior to tempering, it can be appreciated that tempered glass will respond quite readily to a heat treatment, and hence when used as a heating vessel its molecular arrangement starts to change at temperatures far below those at which any change could be detected in a similar but annealed piece. Likewise, annealed glass, for instance glass which has been annealed according to ordinary methods and schedules, while being to all practical intents and purposes free from strain, and ready for service, has been found in time to undergo a change so that instruments of precision, such has thermometers, and the like, which have been fabricated therefrom lose their calibration and their value becomes impaired. In the past it has been the practice of thermometer manufacturers to "season" their product, i. e., subject thermometers which have been completed, except for engraving, to a temperature only slightly in excess of that which will be the maximum reached in service. Such seasoning usually consists in heating the article to a temperature not exceeding 100° Fahrenheit above the temperature that it will attain in service for a period of several days, after which the thermometers are placed in storage for periods frequently extending over several months before the thermometers are finally completed. This is done to insure future accuracy of the instrument. Such seasoning demands that the instrument manufacturers maintain at all times large stocks of completed blanks and a sufficient amount of storage space to house the blanks which space must be specially conditioned and maintained at a reasonably uniform temperature to bring about the proper seasoning of the product.

In a co-pending application filed September 24, 1935, Serial Number 41,930, there is a discussion of the use of tempered glass heating vessels for top of stove service and in such service we have determined that the glass will attain temperatures lying between 150° C. and 500° C. Obviously a glass, for use at the lower of these temperatures only, will be serviceable when it possesses a lower strain release temperature than would be demanded when used at the higher temperature. As a practical matter, however, commercial glassware is liable in the hands of the public to be subjected to the more severe conditions and hence should have a high strain release temperature. In general it will be found that the strain release temperature of tempered glass is approximately 175° C. below the strain temperature of the same glass and as a result a glass which is to be subjected to a high service temperature should be so selected and treated as to have as high a strain release temperature as possible.

One object of this invention is to facilitate the production and assure the accuracy of instruments of precision fabricated from glass, and to materially reduce the time consumed in seasoning the product.

Another object is to increase the range of glass compositions from which tempered glass vessels for top of stove service may be made.

The above and other objects may be attained by employing this invention which embodies among its features accelerating the rate of molecular stabilization in glass by maintaining it for a relatively short period of time at a temperature lying somewhat above its service temperature but below its strain temperature.

Our invention is applicable to many types of glass ranging from borosilicate glasses having thermal coefficients of expansion as low as $32 \times 10^{-7}$ per degree centigrade up to high expansion glasses having thermal coefficients of expansion of about $90 \times 10^{-7}$ per degree centigrade. In Table I below is listed the compositions of a group of glasses of widely different characteristics to which our invention has been found applicable and in view of the diversity of the compositions as shown in Table I and characteristics as shown in Table II, we believe that the rule is applicable to all commercially stable glasses.

*Table I*

|  | A | B | C | D | E | F | G | H |
|---|---|---|---|---|---|---|---|---|
| SiO₂ | 81.0 | 56.4 | 60.5 | 80.1 | 71.0 | 72.5 | 61.9 | 68.8 |
| B₂O₃ | 13.0 | 5.0 |  | 11.4 | 15.0 | 12.2 | .2 | 2.3 |
| Al₂O₃ | 1.7 | 23.0 | 21.4 | 2.1 | 5.0 | 4.5 | 1.9 | 1.5 |
| Na₂O | 4.4 | .8 | .6 | 5.7 | 7.5 | 8.4 | 10.9 | 14.7 |
| CaO |  | 4.1 | 8.7 |  |  |  |  | 5.7 |
| MgO |  | 10.7 | 5.8 |  |  |  |  |  |
| Fluorine |  |  | 1.5 |  |  |  |  |  |
| K₂O |  |  |  | 0.6 | 1.5 | 2.3 | 1.0 |  |
| Li₂O |  |  |  | 0.1 |  |  |  |  |
| PbO |  |  |  |  |  |  | 24.0 |  |
| ZnO |  |  |  |  |  |  |  | 7.0 |

*Table II*

| Glass | Softening temperature | Annealing temperature | Strain temperature | Expansion |
|---|---|---|---|---|
| A | 816 | 561 | 517 | $32 \times 10^{-7}$ |
| B | 929 | 726 | 684 | $38 \times 10^{-7}$ |
| C | 938 | 715 | 672 | $41 \times 10^{-7}$ |
| D | 784 | 557 | 519 | $43 \times 10^{-7}$ |
| E | 744 | 542 | 506 | $57 \times 10^{-7}$ |
| F | 755 | 566 | 533 | $62 \times 10^{-7}$ |
| G | 643 | 452 | 419 | $87 \times 10^{-7}$ |
| H | 702 | 538 | 501 | $89 \times 10^{-7}$ |

Due to the widely differing characteristics of the glasses above mentioned, it is necessary to adjust the stabilization temperatures through widely differing limits but throughout the range of stabilization temperatures the same general law as plotted on the graph, Fig. 1, appears applicable. In other words, by following the time-temperature curve as plotted on the graph, Fig. 1, and simply moving it up or down, the temperature scale, according to the strain temperature of the glass to be treated, we are able to affect a molecular configuration in the glass in a period of about forty-five hours that by prior methods required periods of from fifteen days to six months.

In applying our invention to the manufacture of instruments of precision such as high temperature thermometers to be used, for instance, at temperatures up to 360° C., the thermometer is first fabricated by attaching to a stem, having a capillary bore, and a suitable cross sectional shape, a bulb, of proper dimensions for holding the thermo-responsive fluid. Usually the stem of the thermometer is made from glass G, while the bulb is formed from glass H. It will be noted that the characteristics of the two glasses differ to such an extent that two different stabilization schedules must be employed since the temperatures at which bulb stabilization takes place are higher than those at which the glass from which the tube is made is likely to deform. Hence, we find it desirable to support the stem during stabilization of the bulb. After fabrication of the instrument as above described, the tube and bulb are exhausted and the space is filled with a suitable thermo-responsive fluid, for instance, mercury. The completed thermometer is now ready to be subjected to molecular stabilization. In view of the fact that the glass from which the bulb is made has higher annealing and strain temperatures than that from which the stem is formed, it is necessary that the heat treatment of the bulb be carried on at a higher temperature than that demanded for stabilization of the stem. In fact, the treatment necessary to stabilize the bulb includes subjecting the instrument to temperatures at which deformation and warpage of the stem is likely to take place. We have, therefore, found it necessary to provide a support for the stem throughout its entire length and such a support may take the form of a trough in which the stem lies in a horizontal position. The stem being properly supported, the thermometer is subjected to the heat treatment disclosed in the schedule shown in Table III shown below, and graphically illustrated in Fig. 1 of the drawings.

*Table III*

| Soaking temperature per °C. | Time |
|---|---|
| 505 | 1 hour, then drop temperature to |
| 495 | 5 hours, then drop temperature to |
| 485 | 10 hours, then drop temperature to |
| 475 | 15 hours, then drop temperature to |
| 470 | 10 hours, then drop temperature to |
| 435 | 2 hours, then drop temperature to |
| 425 | 3 hours, then drop temperature to |
| 415 | 5 hours, then drop temperature to |
| 405 | 10 hours, then drop tempertaure to |
| 395 | 15 hours, then drop temperature to |
| 390 | 10 hours, then drop temperature to |
|  | Out to room temperature. |

It is to be noted that such a treatment really embodies a combination of two separate and distinct stabilization schedules as by the time the temperature reaches 470° C., it has passed below the point at which further stabilization of the bulb is appreciably effected and the further treatment applies primarily to stabilization of the stem. Therefore, substantially complete stabilization of an article made from glass H shown in Table I above can be effected in a period of about forty-five hours by employing temperatures ranging from 505° C. down to 470° C., while the temperature range for stabilization within the same period of time for articles made from glass G lies between 470° C. and 390° C. By this method we are able to bring about substantially complete stabilization of instruments of precision such as thermometers well within a period of ninety-six hours, or four days, and obtain results equally as satisfactory as if the articles had been treated by the ordinary methods now employed for periods of time ranging from fifteen days upwards.

In carrying our invention into practice, and applying it to the production of top of stove ware from tempered glass, we prefer to employ glasses having the compositions and characteristics possessed by glasses A through F in Tables I and II. In order to obtain the highest resistance to strain release in such ware, we have found it advantageous to temper the ware to a degree in excess of that which it is to finally possess, and then subject it to a heat treatment, similar to annealing, by which the temper is reduced to that finally desired. In so doing, we select a glass, for instance such as Glass C above described, and after shaping the article in any suitable manner, we subject it while it is still hot to a temperature equalizing treatment for a short period of time in a kiln, the temperature of which is about 900° C. After so heating the article, it is subjected to a chilling treatment, preferably consisting of a molten salt bath held at about 450° C. This introduces into the article a degree of tension of about four kilograms per square millimeter which is considerably more than is necessary or desirable for the type of service to which it is to be subjected. After so tempering the article, it is subjected to a heat treatment which, for example, may be heating it to a temperature of 535° C. for a period of two hours, or subjecting it to a temperature of about 510° C. for a period of seven hours. This treatment releases the tension to about three kilograms per square millimeter and simultaneously brings about a molecular rearrangement or movement toward stabilization which materially reduces the tendency of the glass to further release its tension when subjected to the temperatures experienced in top of stove service. By thus treating glass articles we have been able to so change the characteristics of the glass that the article can be subjected to service temperatures as much as 25° C. in excess of those which a like article, initially tempered to three kilograms per square millimeter will stand before strain release will take place.

Figure 2:
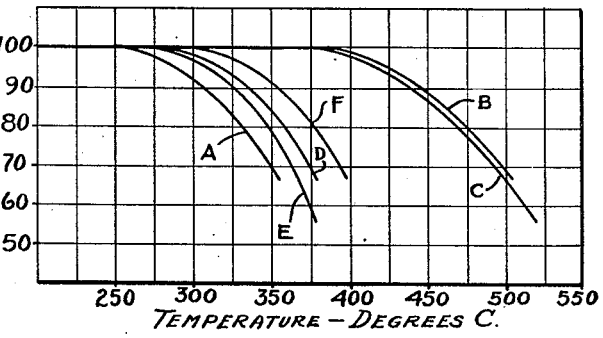
Figure 3:
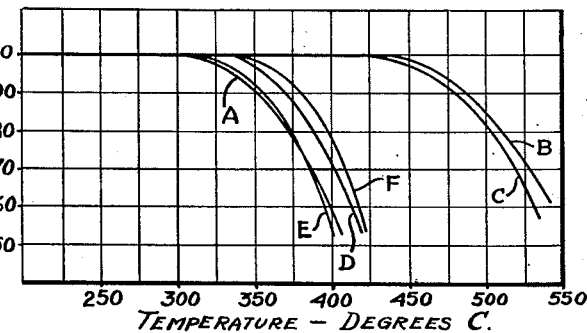

The curves of the graph, Fig. 2, show the strain release in one-hundred hours of the various glasses above referred to at temperatures ranging from 250° C. upwards, while the curves of the graph, Fig. 3, show the strain release in one hundred hours of the various glasses at like temperatures after the glasses have been treated in accordance with the invention herein disclosed. It is to be noted that in each and every instance the strain release temperature of the treated glass article is higher than that of a like article which has been tempered but not heat treated in accordance with this invention.

Minor changes may be resorted to without departing from the spirit and scope of our invention as claimed.

We claim:

1. The method of producing a tempered glass article, which includes rapidly cooling the article from a high temperature to produce a high permanent strain in the glass and removing a part only of the permanent strain so producing by a prolonged heat treatment of the article at a temperature below its annealing temperature but materially above room temperature.

2. The method of producing a tempered glass article, which includes introducing excess permanent strain in the article by rapidly cooling the article from a high temperature and reducing such permanent strain to a predetermined value of not less than half the initial strain by subjecting the tempered article for a limited time to a lower temperature but materially above room temperature.

3. The method of producing a tempered glass article, which includes introducing a permanent strain in the article of substantially four kilograms per square millimeter by rapidly cooling the article from a high temperature and reducing such permanent strain to about three kilograms per square millimeter by subjecting the tempered article for a limited time to a lower temperature but materially above room temperature.

4. The method of producing a tempered glass article, which includes rapidly cooling the article from a high temperature to produce a high permanent strain in the glass, removing a part of the permanent strain so introduced and stabilizing the remaining permanent strain by a prolonged heat treatment of the article at a temperature below its annealing temperature.

5. The method of stabilizing the molecular arrangement of tempered glass which includes so tempering the glass as to produce a high permanent strain in it and then uniformly heating the glass for a limited time at a temperature lying below the strain temperature of the glass but above the temperature at which it was chilled while being tempered.

6. The method of increasing the viscosity of tempered glass which includes so tempering the glass as to produce a high permanent strain in it and then uniformly heating the glass for a limited time at a temperature lying below the strain temperature of the glass but above the temperature at which it was chilled while being tempered.

7. The method of producing a tempered glass article which includes introducing excess permanent strain in the article by rapidly cooling the article from a high temperature and reducing such permanent strain to not less than half by subjecting the tempered article to a lower temperature which lies above that which it will experience in normal use but below its annealing temperature.

8. The method of producing a tempered glass article which includes introducing excess permanent strain in the article by rapidly cooling the article from a high temperature and reducing such permanent strain to not less than half by subjecting the tempered article to a lower temperature which lies above that which it will experience in normal use but below its strain temperature.

9. The method of producing a tempered glass article which includes rapidly cooling the article from a high temperature to produce a high permanent strain in the glass, removing a part of the permanent strain so produced and stabilizing the remaining permanent strain by a prolonged heat treatment of the article at a temperature below its strain temperature but above room temperature.

10. The method of raising the effective strain release temperature of a tempered glass article having a desired permanent strain condition set therein which comprises rapidly cooling the article from a high temperature to produce a strain condition therein which is in excess of that desired in the finished article and uniformly heating the tempered article for a predetermined period of time at an elevated temperature to reduce the strain condition of the article to the desired maximum value.

11. The method of raising the effective strain release temperature of a glass article having a desired permanent strain condition set therein which comprises rapidly chilling the article from a high temperature to produce a maximum strain therein which is greater than desired in the finished article and thereafter subjecting the tempered glass article to a prolonged heat treatment at a temperature in excess of that to which the article has been chilled to reduce the permanent strain to the desired maximum value.

HOWARD R. LILLIE.
WILLIAM W. SHAVER.